(12) United States Patent
Hector, Jr. et al.

(10) Patent No.: US 9,718,434 B2
(45) Date of Patent: Aug. 1, 2017

(54) TUNABLE ENERGY ABSORBERS

(71) Applicant: GM GLOBAL TECHNOLOGY OPERATIONS LLC, Detroit, MI (US)

(72) Inventors: Louis G. Hector, Jr., Warren, MI (US); Anil K. Sachdev, Rochester Hills, MI (US); Jeff Wang, Shanghai (CN); Hanif Muhammad, Troy, MI (US); Nilesh D. Mankame, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 90 days.

(21) Appl. No.: 14/601,798

(22) Filed: Jan. 21, 2015

(65) Prior Publication Data

US 2016/0207494 A1 Jul. 21, 2016

(51) Int. Cl.
*B60R 21/00* (2006.01)
*B60R 21/34* (2011.01)

(52) U.S. Cl.
CPC ........ *B60R 21/34* (2013.01); *B60R 2021/343* (2013.01)

(58) Field of Classification Search
CPC .......................... B60R 21/34; B60R 2021/343
USPC ........... 296/187.04, 187.09, 193.11, 187.12; 180/69.2, 69.22
See application file for complete search history.

(56) References Cited

U.S. PATENT DOCUMENTS

| | | | | |
|---|---|---|---|---|
| 4,919,473 | A * | 4/1990 | Laimighofer | B60J 5/0444 188/371 |
| 6,203,098 | B1 * | 3/2001 | Motozawa | B62D 21/152 293/133 |
| 7,669,918 | B2 * | 3/2010 | Buravalla | B62D 21/15 296/187.03 |
| 8,356,857 | B2 | 1/2013 | Ralston et al. | |
| 8,485,588 | B1 | 7/2013 | Voss et al. | |
| 2010/0314907 | A1 * | 12/2010 | Iwano | E05B 77/08 296/187.09 |

* cited by examiner

*Primary Examiner* — Joseph D Pape
(74) *Attorney, Agent, or Firm* — Mickki D. Murray, Esq.; Parks IP Law LLC

(57) ABSTRACT

An energy absorber according to various embodiments can include a structure having a predetermined cross-sectional profile. A hollow profile is formed within the structure. The pre-determined cross-sectional profile of the structure is configured based on a deceleration-time profile that includes a first period and a second period. The first period is defined by a substantially sharp and linear increase in magnitude of the deceleration of an impact until a maximum deceleration value is achieved. The second period is defined by a rapid decrease in the magnitude of the deceleration.

25 Claims, 11 Drawing Sheets

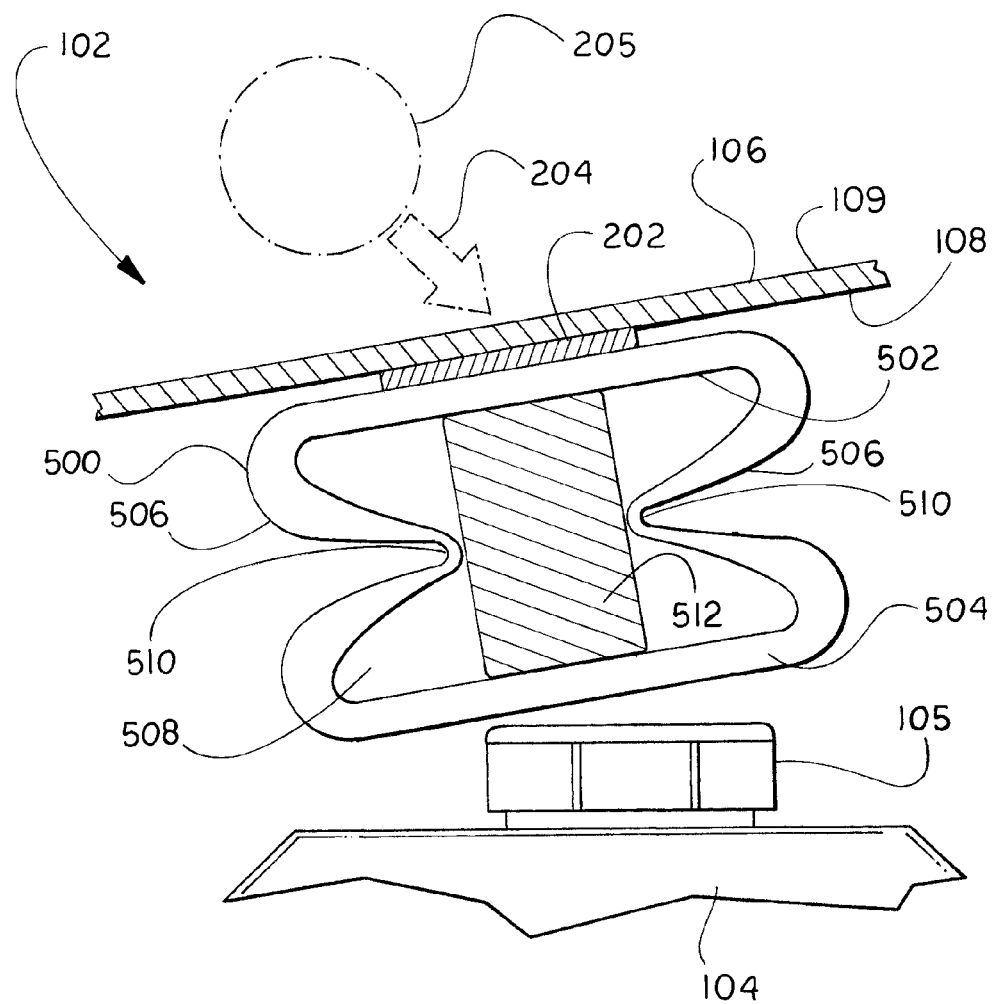
Fig_5

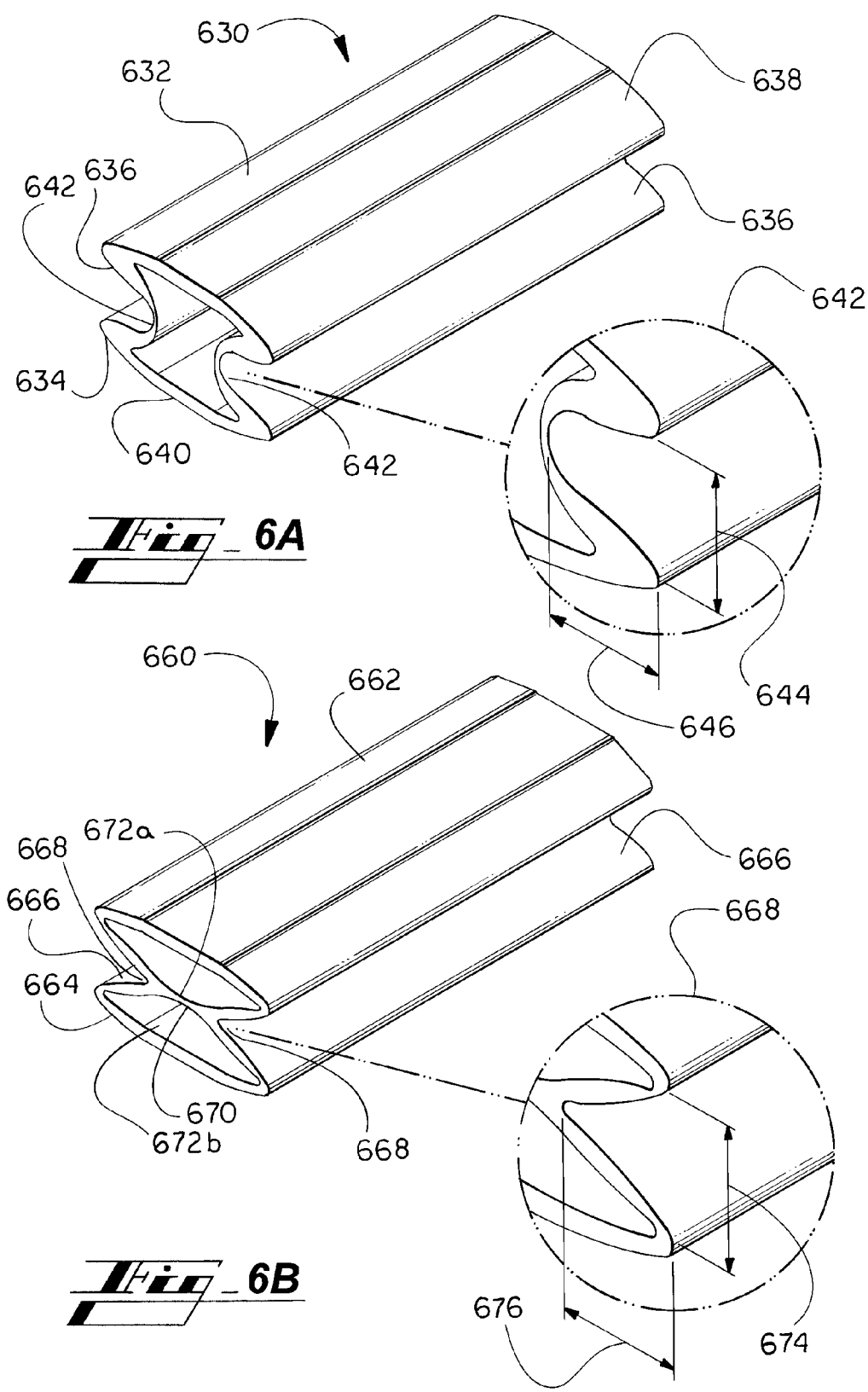

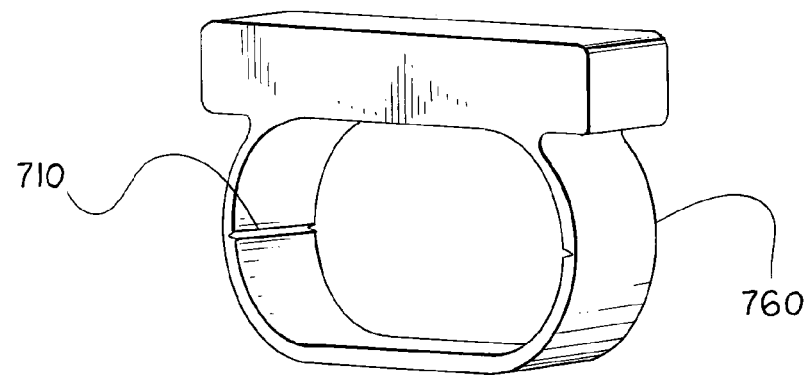
Fig_8
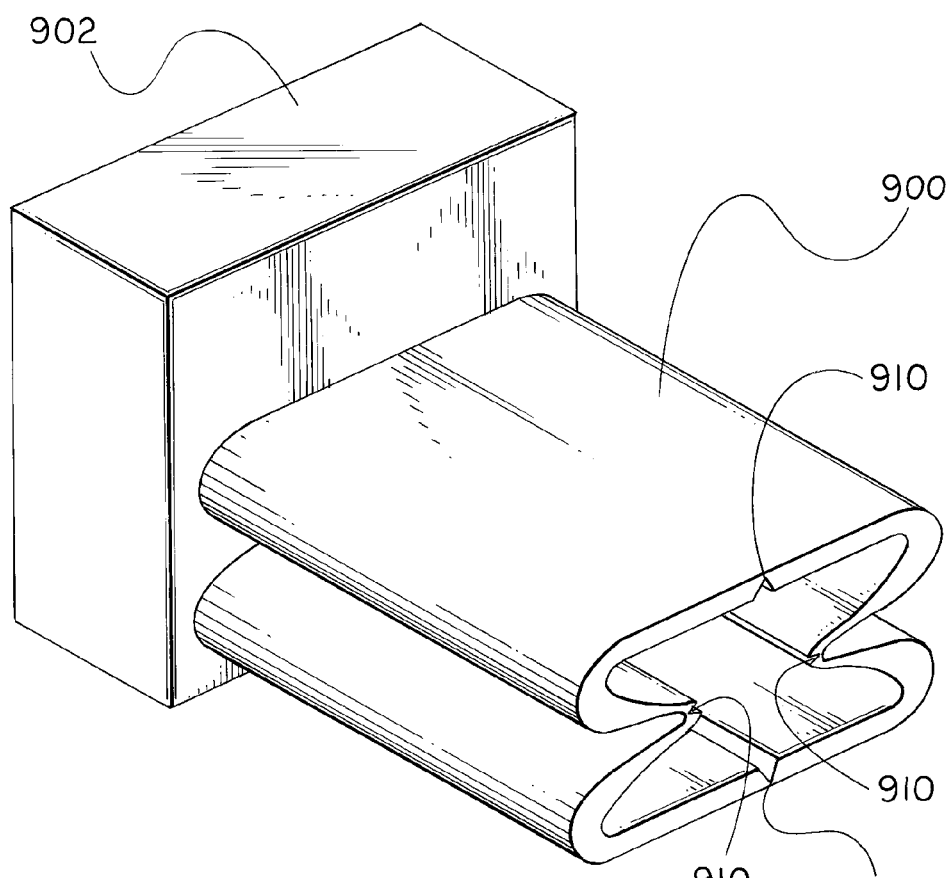
Fig_9

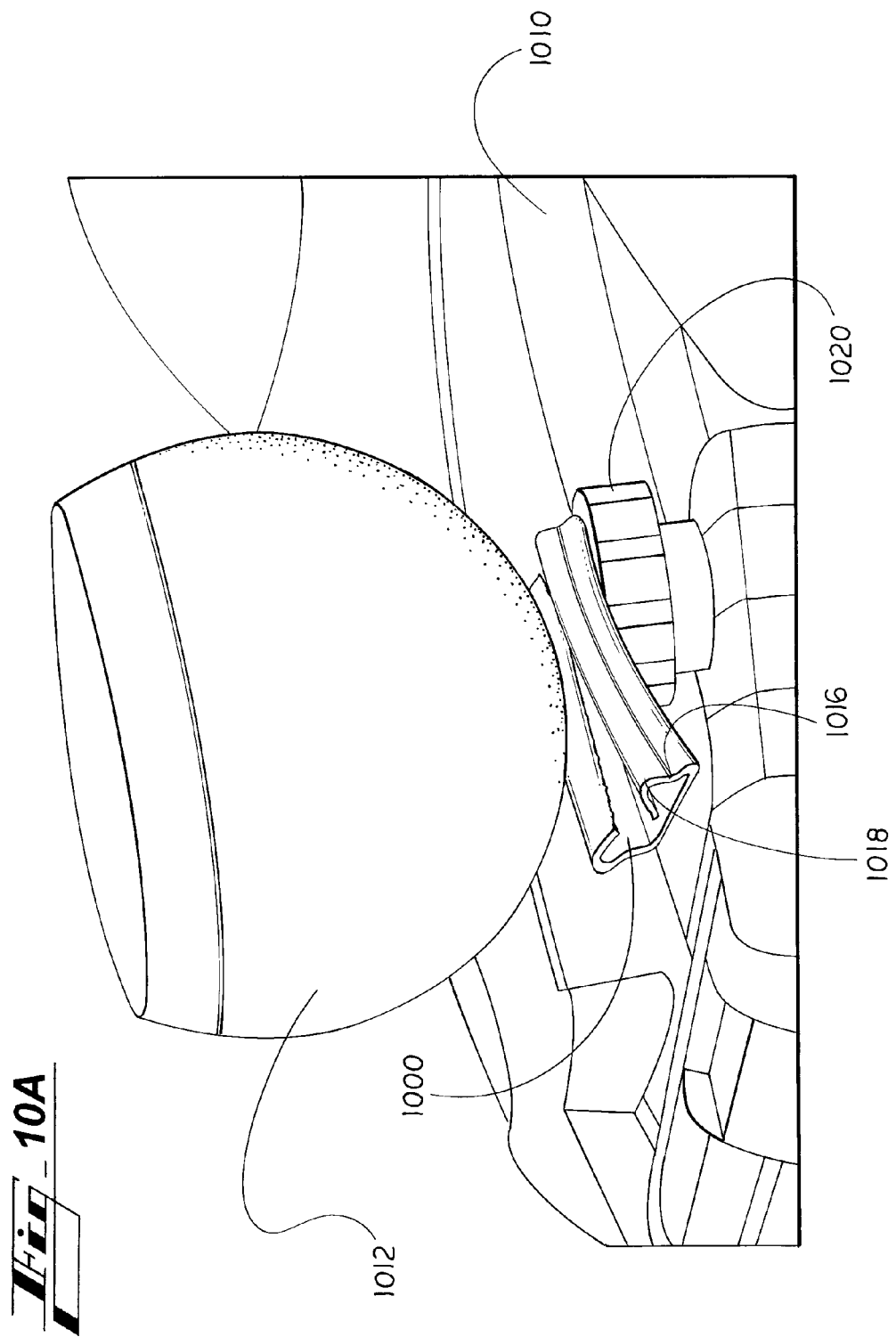

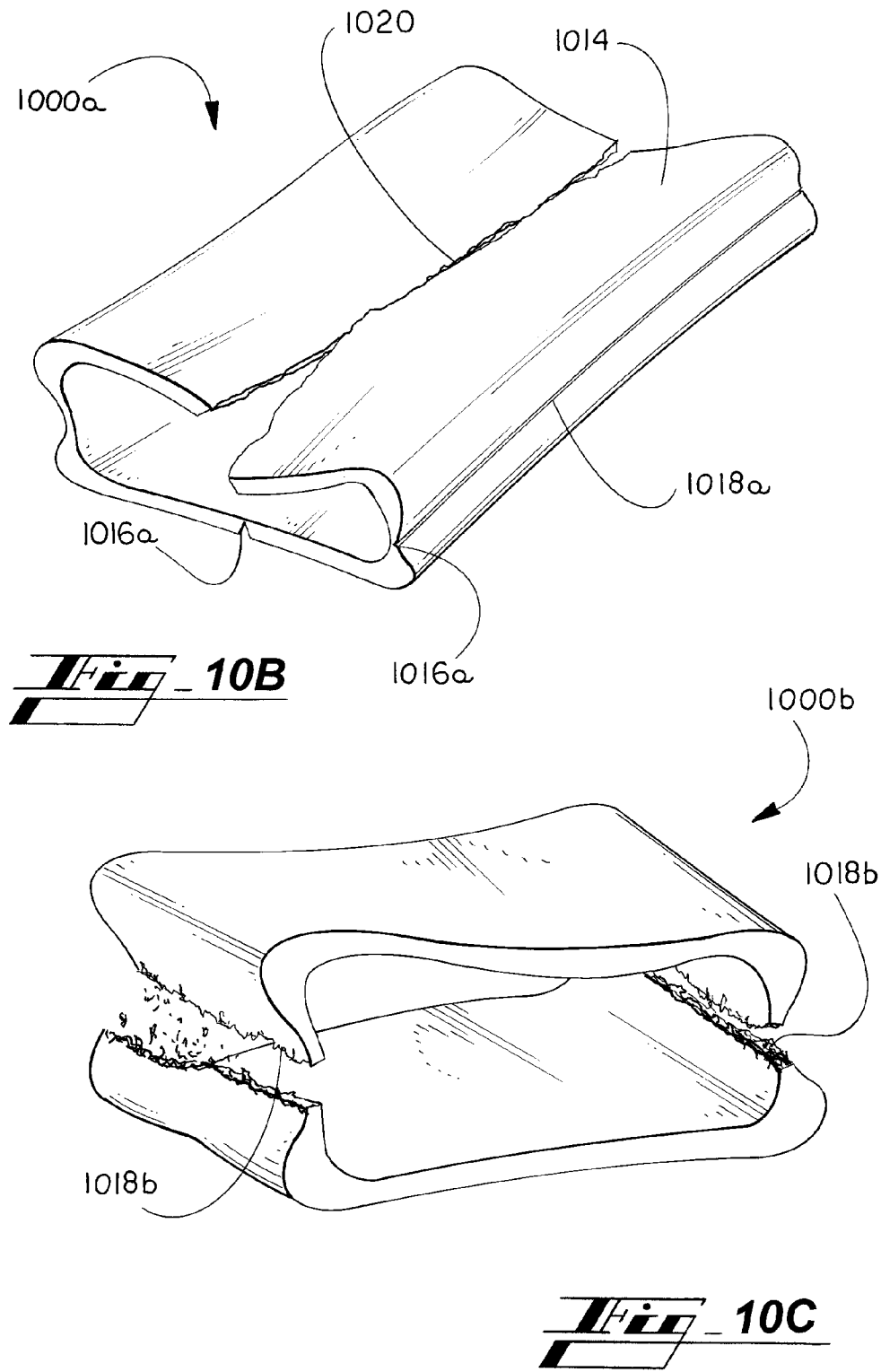

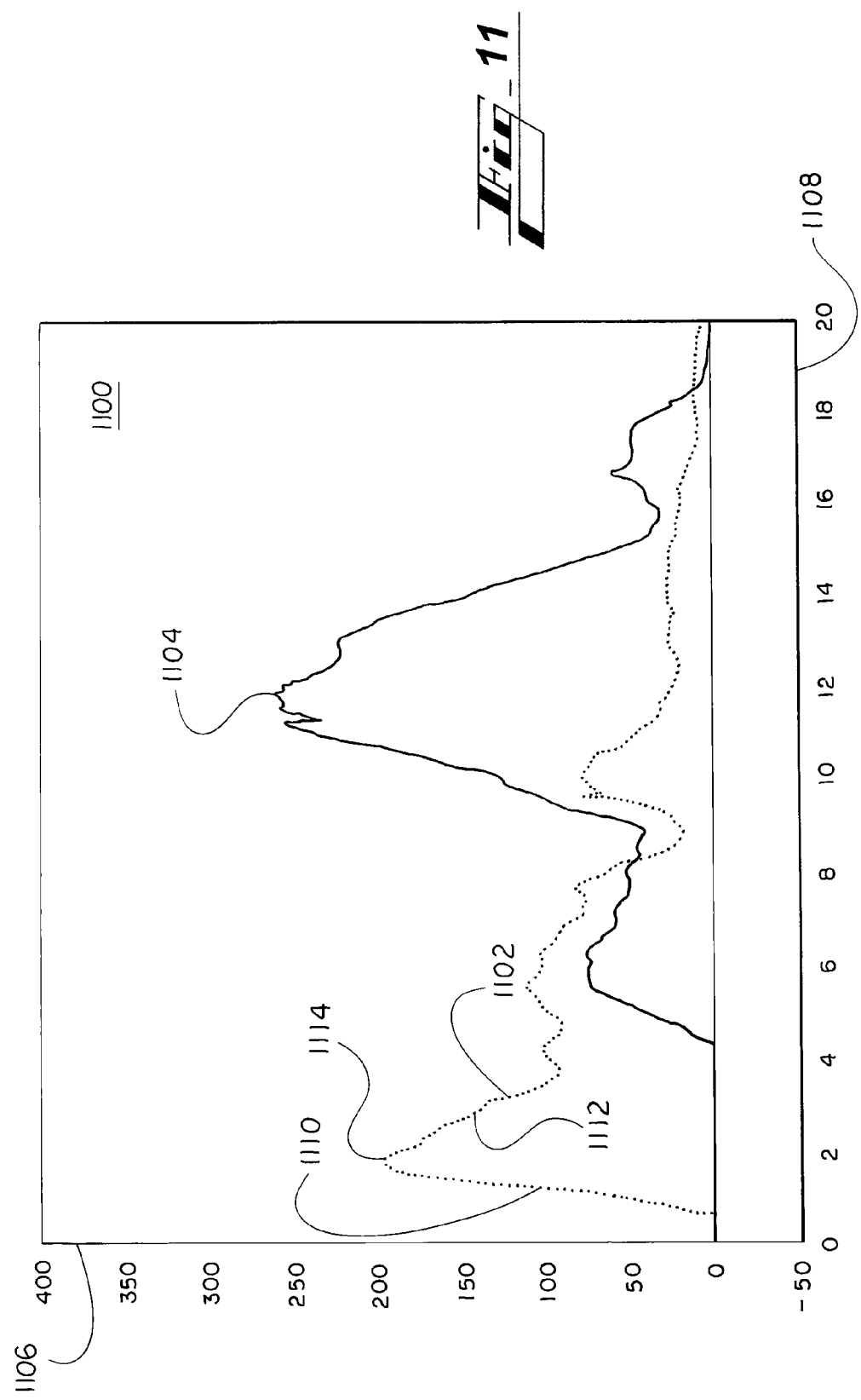
Fig_11

TUNABLE ENERGY ABSORBERS

TECHNICAL FIELD

The present disclosure relates generally to management of exterior impacts to vehicle hoods and other exterior parts or panels.

BACKGROUND

The hood structure of a vehicle plays a role in managing how energy is absorbed when there is contact between the vehicle and an object, such as an obstacle. During an impact event, a vehicle hood must absorb a significant amount of energy over a small area while precluding impact with a hard engine compartment component as the hood is pushed into the engine compartment. As modern vehicles are very densely packaged under the hood, various hard parts, such as a coolant cap and shock towers, are very close to the hood. Use of non-ferrous alloys in vehicle hoods, such as aluminum, that do not offer the ductility and stiffness of steel hoods but provide significant mass reduction and improved fuel economy, may require larger basin distances.

Accordingly, there is a need for a system that decreases the severity of impacts to vehicle hoods and other exterior parts or panels.

SUMMARY

An energy absorber according to various embodiments can include a structure having a predetermined cross-sectional profile. A hollow profile is formed within the structure. The pre-determined cross-sectional profile of the structure is configured based on a deceleration-time profile that includes a first period and a second period. The first period is defined by a substantially sharp and linear increase in magnitude of the deceleration of an impact until a maximum deceleration value is achieved. The second period is defined by a rapid decrease in the magnitude of the deceleration.

In various embodiments, the present disclosure relates a vehicle panel, which may be a hood, covering an object. The vehicle panel includes an inner surface and an outer surface. The inner surface faces a hard object in the engine compartment and is offset from the object by a basin distance. The outer surface is substantially opposite the inner surface and the object. A tunable energy absorber is disposed between the inner surface and the object.

The tunable energy absorber has a multiply-connected structure, which can be formed as an extruded structure having a desired cross-sectional profile. The multiply-connected structure includes at least one hollow profile formed within the extruded structure. The desired cross-sectional profile of the extruded structure is configured based on a deceleration-time profile that includes a first period and a second period. The first period is defined by a substantially sharp and linear increase in magnitude of the deceleration of an impact until a maximum deceleration value is achieved. The second period is defined by a rapid decay in the magnitude of the deceleration.

The above features and advantages, and other features and advantages, of the present technology are readily apparent from the following detailed description of embodiments and appended claims, when taken in connection with the accompanying drawings.

DESCRIPTION OF THE DRAWINGS

FIG. 5 is a schematic, cross-sectional view of another tunable energy absorber attached to the underside of a vehicle hood, and having a core member inserted into a hollow region of the tunable energy absorber structure.

FIG. 6A is a perspective, cross-sectional view of another involuted tunable energy absorber.

FIG. 6B is a perspective, cross-sectional view of another involuted tunable energy absorber.

FIG. 8 is a perspective view of a body structure of another non-involuted or exvoluted tunable energy absorber according to yet another embodiment of the present teachings.

FIG. 9 shows an extrusion die that can be used to produce an extruded structure according to the present teachings.

FIG. 10A illustrates a schematic, isometric view of the fracturing process of an energy absorber during a collision of an impact object, wherein the hood of the vehicle is removed for clarity.

FIG. 10B illustrates a schematic, isometric view of the fracturing process of an energy absorber demonstrating fracturing along the top section and the involuted sections of the tunable energy absorber.

FIG. 10C illustrates a schematic, isometric view of the fracturing process of a tunable energy absorber demonstrating fracturing along the involuted sections of the tunable energy absorber.

FIG. 11 is a graph illustrating a comparison between an actual performance of an involuted tunable energy absorber curve and a baseline curve without any energy absorber.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure. For example, any two or more elements described separately could be combined into a single element, and vice versa.

In various embodiments, the present disclosure describes tunable energy absorbers that can be positioned under or within a hood above or in the vicinity of hard objects (engine oil caps, shock towers) in the engine compartment, and systems and methods for providing the same. The systems and methods are described herein primarily in connection with automobiles, but the technologies of the present disclosure are not limited to use with automotive vehicles. The tunable energy absorber or energy absorbers (also known as "localized impact energy absorbers" or "local energy absorbers") described herein can be implemented in a wide variety of applications including in, for example, aircraft, aerospace, recreational vehicles, and marine vehicles.

Figure 1:
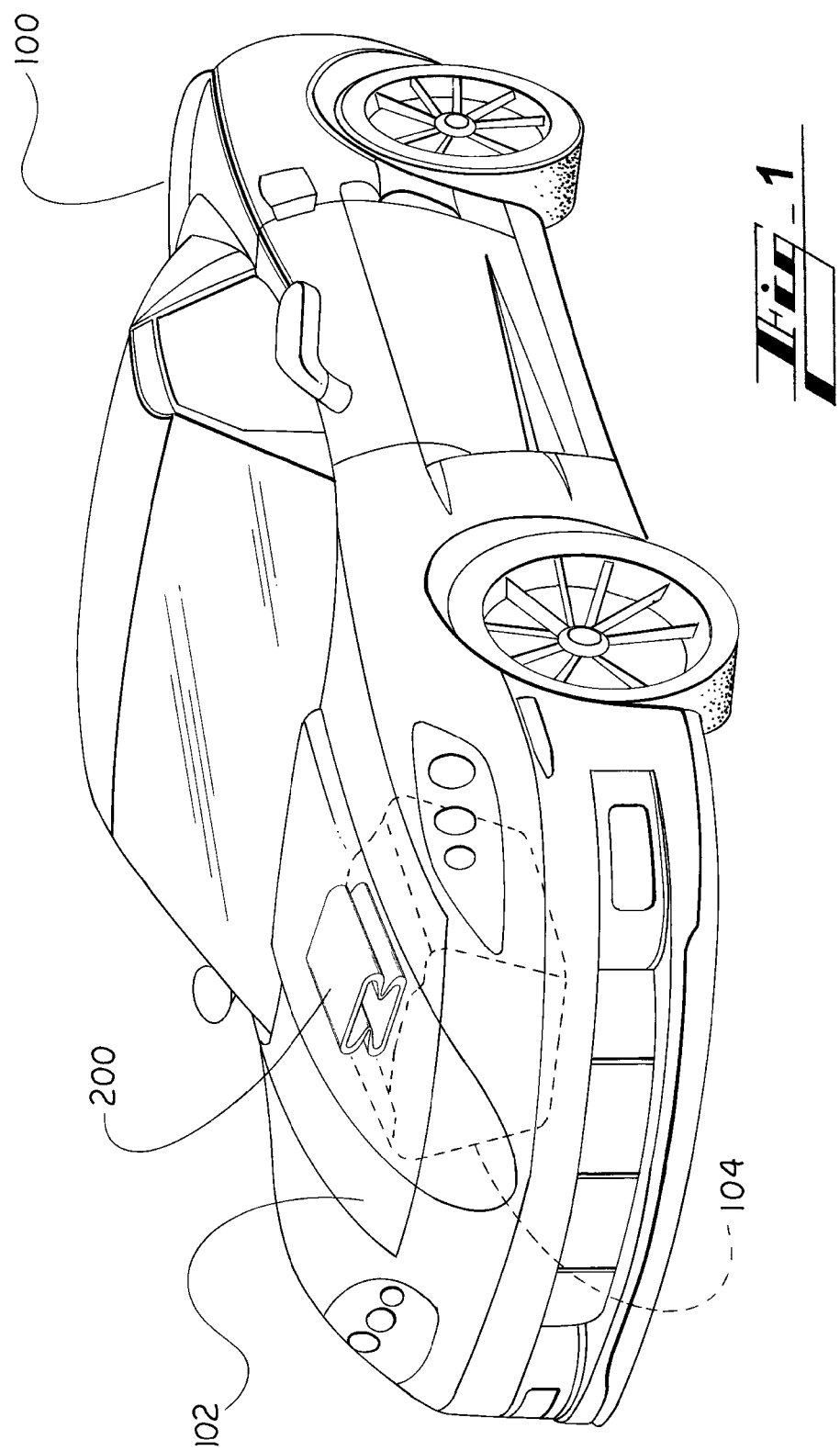
FIG. 1 is a schematic, isometric view of a vehicle having a tunable energy absorber under a hood.
Figure 2:
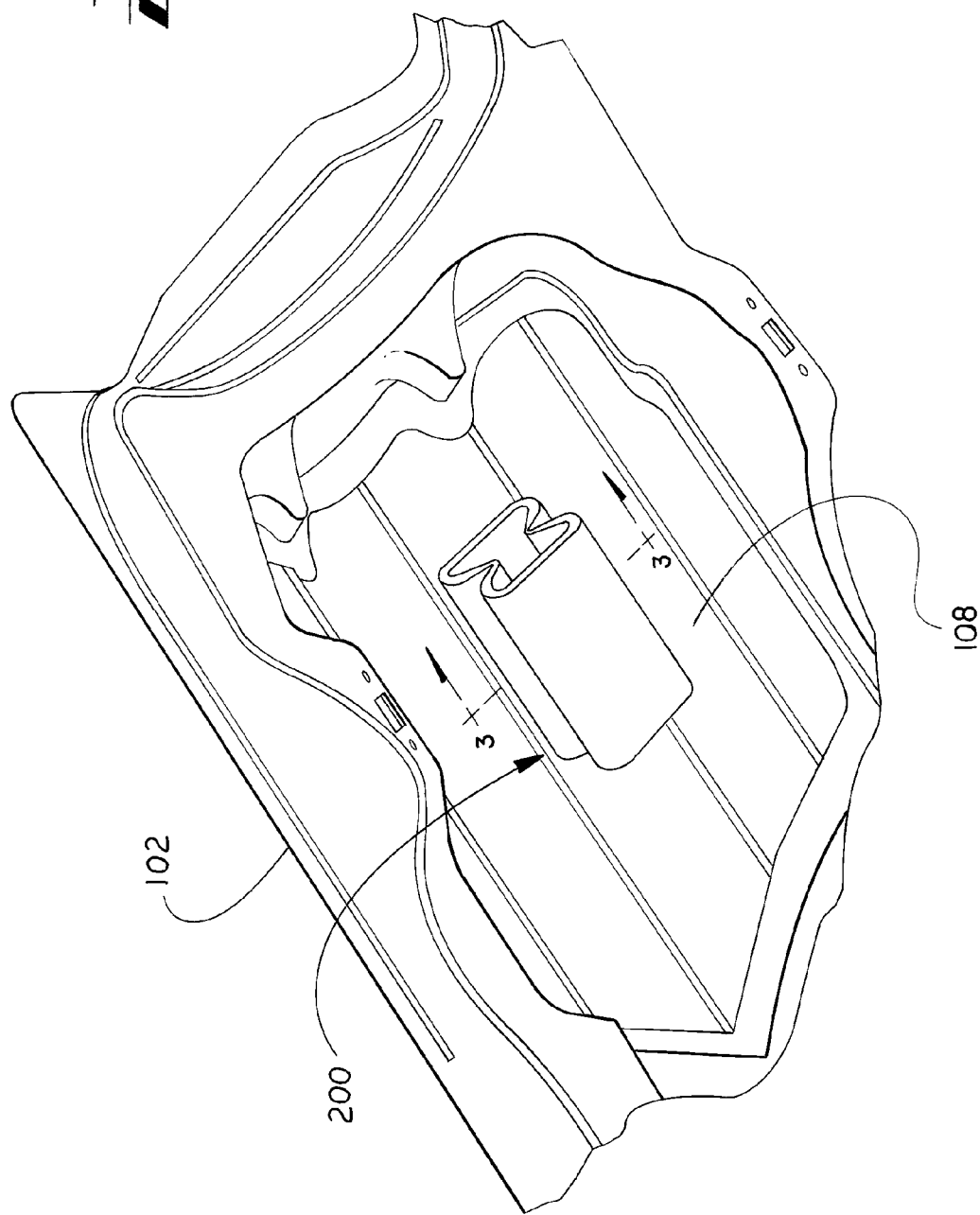
FIG. 2 is a schematic, isometric view of the underside of the hood shown in FIG. 1, showing an involuted tunable energy absorber.
Figure 3:
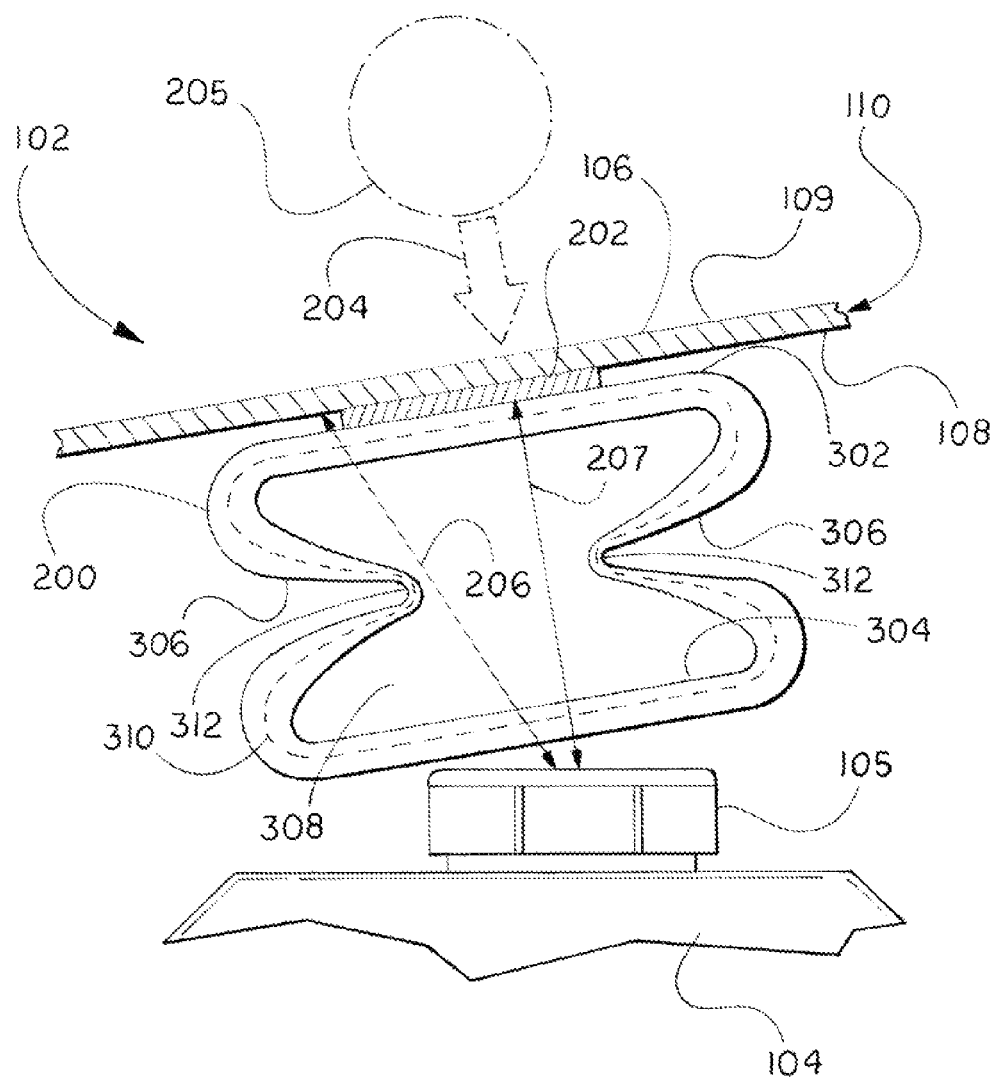
FIG. 3 is a schematic, cross-sectional view taken substantially along a line 3-3 of FIG. 2.

Referring to the drawings, wherein like reference numbers correspond to like or similar components wherever possible throughout the several figures, FIGS. 1-3 illustrate various views of a vehicle 100 or portions thereof. Vehicle 100 includes a vehicle hood assembly 102 covering a hard or a rigid object 104, 105. The term "rigid," as used herein, is not used in an ideal sense, but represents relatively hard objects, or relatively heavy objects, that may provide a reactive force to an impacting object. As used herein, the terms "rigid object" and "hard object" are used interchangeably.

The hard object 104, 105 may be, for example and without limitation, an engine, a battery, a supercharger, a sway bar, a shock tower, a fluid filled port cap, another object, or combinations thereof lying in closer proximity to the underside of the hood or hood inner than other components. The hard object 104, 105, shown in FIG. 3, may be, for example, a hard object(s), such as oil caps, shock towers, engine block, and strut housings. As used herein, the term "hard" represents relatively hard objects, or relatively heavy objects, that may significantly contribute to damage during collisions. In various embodiments, the "hardness" is relative to the parameters of the vehicle hood assembly 102, its subcomponents as detailed below, or other vehicle components.

FIG. 1 shows a schematic, isometric view of the vehicle 100 with the hard object 104shown in dashed lines. The hard object 104 is associated with components within the engine compartment below the vehicle hood assembly 102. FIG. 2 shows the underside of the vehicle hood assembly 102, with a tunable energy absorber 200 affixed to the underside of the hood. FIG. 3 shows a cross-sectional view taken substantially along line 3-3 of FIG. 2 showing the tunable energy absorber 200 filling the majority of the basin 206, which is a measure of the distance between the inner surface of the hood, or basin 207, which is a bond 202 between the tunable energy absorber and the hood and the hard object 105 in the engine compartment. Features and components shown in other figures may be incorporated and used with those shown in FIGS. 1-3, and components may be mixed and matched between any of the configurations shown.

Reference will be made to the drawings which typically show a single tunable energy absorber at each location positioned above a hard object 104, 105. It should be understood that each location may include multiple tunable energy absorbers above the hard object 104, 105. The tunable energy absorbers can be of a variety of sizes and shapes. Although the figures show the tunable energy absorber having symmetrical profiles, it should be understood that the shape is not limited to those shown in the drawings. The tunable energy absorbers shown in the figures are exemplary only and are not meant to be limiting. In addition, a single tunable energy absorber may be asymmetrical and include a plurality of holes or cavities in the absorber.

Vehicle 100 is shown for illustrative purposes and demonstrates only one possible environment into which the components described herein may be incorporated. The vehicle hood assembly 102 is generally illustrative of the forward region or the hood region of the vehicle 100. The hard object 104, 105 is highly-illustrative, and may represent different components disposed within an engine compartment. The engine compartment is used to house various vehicular components, including steering system components, braking system components, and propulsion systems.

While the present technology is described in detail with respect to automotive applications, those skilled in the art will recognize the broader applicability of the technology. Those having ordinary skill in the art will recognize that terms such as "above," "below," "upward," "downward," et cetera, are used descriptively of the figures, and do not represent limitations on the scope of the technology, as defined by the appended claims. Any numerical designations, such as "first" or "second" used are not intended to be limiting, and any specific component may be referenced with any number.

In FIGS. 2-3, the vehicle hood assembly 102 can employ a hood panel 106 structure comprising an outer panel 109 (called an external panel or outside sheet) and an inner panel 108 (internal panel or inside sheet) which are combined to have a closed cross-sectional structure separated by a space 110. The outer panel 109 is substantially opposite the inner panel 108. In various embodiments, the outer panel 109 and/or the inner panel 108 can include an inner panel portion and an outer panel portion. As it is known in the art, the hood assembly 102 can be constructed having various panel configurations. The specific details of the various types of panel constructions configurable within the hood assembly 102 are not within the scope of the technology and therefore will not be discussed in detail. The examples shown and described herein with regard to the panels in the hood assembly 102 are exemplary and nonlimiting.

Thus, the tunable energy absorber 200 can be attached to various positions within the hood assembly 102 such as through a bond 202. In some embodiments, the tunable energy absorber 200 is operatively attached to the inner panel 108. In such an embodiment, the tunable energy absorber 200 can be attached at either the inner surface, which faces the engine compartment or the outer surface of the inner panel 108. In other embodiments, the tunable energy absorber 200 is operatively attached to the inner surface of the outer panel 109. In such instance, the tunable energy absorber 200 can be attached at either the inner panel portion or the outer panel portion of the outer panel 109. Alternatively, the tunable energy absorber 200 may be nested in a pocket defined by the inner and outer panels. Alternative means of securing the tunable energy absorber include mechanical fasteners, snap fits, nests, etc.

The tunable energy absorber 200 is a shell structure that is operatively a multiply-connected structure, and can be attached at various locations on the hood panel 106 such that it is adjacent to the hard object 105. The term "multiply" as used herein refers to doubly-connected, triply-connected, or higher connectivity.

In FIG. 3, the bond 202 may be, for example and without limitation, an adhesive bond, a welded bond, or a bond via fasteners, like screws or rivets. As shown in FIG. 3, the tunable energy absorber 200 can be attached to the inner panel portion of the inner panel 108 such that it is disposed between the inner panel 108 and the hard object 105 in the engine compartment of the vehicle 100. Alternatively, the tunable energy absorber 200 can be attached to the inner panel portion of the outer panel 109 such that it sits interior within the space 110 (not drawn to scale) and operatively above the hard object 105 in the engine compartment.

As shown in FIG. 3, the multiply-connected structure or multiply-connected body of the tunable energy absorber 200 is configured to absorb energy delivered by an impact load 204 indicated by the arrow to the outer surface of the outer panel 109 of the vehicle hood assembly 102, such as from an impact object 205. The impact load and its direction relative to the hood assembly 204 are represented as an arrow, which is illustrative only. The direction and type of impact may vary and the nature of the impact object 205 may also vary, as for example in shape and mass, causing the impact load 204 to vary.

The inner surface of the inner panel 108of the hood panel 106 is offset from the hard object 105 by a basin depth 206. The basin depth 206 may be defined or measured in different ways. In FIG. 3, the basin depth 206 is shown as the shortest absolute distance between the inner surface of the inner panel 108 and the hard object 105. However, an alternative measurement may be made along a line substantially parallel to the expected direction of the impact load 204, which is shown as alternative basin depth 207.

If the tunable energy absorber 200 was not attached to the hood panel 108 during a collision, the impact load 204 may cause the vehicle hood assembly 102 to locally deform until the hood assembly 102 crosses the basin depth 206 or 207 and makes contact with the hard object 105. However, the tunable energy absorber 200 is configured to first contact the hard object 105 thereby dissipating energy from the impact load 204 before the vehicle hood assembly 102 makes contact with the hard object 105, thereby reducing the force applied by impact with the hard object 105. The extent to which the tunable energy absorber dissipates the impact load 204 may be quantified using the head injury criteria (HIC), or HIC score. The HIC score is the key metric for pedestrian head injury in vehicle collisions. The HIC score, calculated from the deceleration of the head's center of gravity during a head impact, is a measure to assess potential head injury. Without the tunable energy absorber 200, the peak loads experienced by the object 205 are higher as the object 205 passes through the basin depth 206 or 207 and contacts the hard object 105. The HIC score is a useful determinant for a variety of objet types.

In experimental tests, the HIC score or variable would be derived from the deceleration and time history recorded by an accelerometer mounted at the center of gravity of the impact object 205 when exposed to impact with the vehicle hood assembly 102. The HIC score is a representation of the predicted response of the impact object 205 to the impact with the vehicle hood assembly 102 and the underlying hard object 105, 104 as dissipated by the tunable energy absorber 200.

The HIC formula is represented as:

$$\left\{ (t_2 - t_1) \left[ \frac{1}{t_2 - t_1} \int_{t_1}^{t_3} a(t) dt \right]^{2.3} \right\}_{max}$$

where $t_2 - t_1 \leq 15$ milliseconds (ms) and $a(t)$ is the deceleration at the center of gravity of the head in units of g's (acceleration due to gravity) and t is time in milliseconds. One skilled in the art would understand that the terms "deceleration" and "resultant acceleration" are used interchangeably with the two differing by a multiplicative factor of −1. In other words, the deceleration of the head means that the minus sign on the acceleration is ignored.

The HIC score includes the effects of the deceleration on the object 205 and the time duration of the deceleration during impact with the vehicle hood assembly 102. In some models or calculations of the HIC score, higher scores result from either: short impact duration times at larger decelerations, or longer impact duration times at smaller decelerations. For a given basin depth 206, the tunable energy absorber 200 is configured to minimize or reduce the HIC score. Alternatively, if required to meet a specific HIC score, the tunable energy absorber 200 is configured to do so while minimizing the basin depth 206 or 207.

The HIC value calculated from a deceleration—time waveform at impact is typically used to evaluate protection performance during a collision with the hood. A hood structure with a low HIC score is desirable.

In the SAE Technical Paper Series, 2007-01-0759, "Optimization of Head Impact Waveform to Minimize HIC", presented Apr. 16-19, 2007, pp. 1-12, which is hereby incorporated by reference, J. P. Wu and B. Beaudet proposed a deceleration-time profile (which is indicative of the deceleration of the head form) as the target for pedestrian head impact to achieve a HIC score≤1000. However, the authors did not provide any hood designs that could result in such a performance.

The deceleration-time profile with respect to the impact object 205, when the impact object 205 collides with an area of the hood that is positioned above a hard object 104 or 105, is such that a first portion of the profile is generated when the impact object 205 contacts the outer surface of the outer panel 109 of the hood panel 106 at the onset of the collision. Then, a second portion of the profile is generated when the hood portion that contacts with the impact object 205 during impact moves downward and contacts hard internal parts such as hard objects 104, 105 arranged underneath the hood.

Thus, it is desirable to provide a vehicle hood assembly 102 which is able to safely decelerate, in a given, limited distance (as represented by the basin distance 206 or 207) an impact object 205, when it impacts the vehicle hood assembly 102. To do so, the vehicle hood assembly 102 must absorb a significant percentage of the impact energy transferred by the impact object 205. This is accomplished physically by providing the vehicle hood assembly 102 with an energy absorber 200 to substantially absorb the energy of the impacting object 205. For protection during a collision, energy absorbers 200 are attached to the vehicle hood assembly 102 at various locations, for example, at either on the inner surface of the inner panel 108 of the hood inner panel or on the inner surface of the outer panel 109 above objects 104 or 105 in the engine compartment.

The tunable energy absorbers 200 can be configured with various cross-sectional profiles that can be tuned to reduce the HIC scores at various objects 104 or 105 under the vehicle hood during an impact with the vehicle hood assembly 102. Thus, the geometry of the tunable energy absorber 200 can be tuned for a specific object 104, 105 in a vehicle to achieve, for example, a HIC score≤1000 via plastic deformation and fracture of the absorber as the absorber contacts the object 104, 105 during the impact.

In some conventional energy absorbers, designers have attempted to achieve a HIC score≤1000 based on the material selection of the energy absorber. In such cases, the selection of a material such that the energy absorbers will exhibit specific deformation, fracturing and energy absorption characteristics that can affect the HIC score. In contrast, the energy absorber 200 of the present disclosure achieves a HIC score≤1000 by (a) configuring geometric design parameters (i.e. cross-section) which can be suitably "tuned" so as to achieve a certain structural connectivity; and (b) providing multiple paths within the absorber for simultaneous crack nucleation and growth during impact with hard objects 104 or 105 so as to achieve a profile that resembles the deceleration-time profile proposed by Wu and Beaudet, cited above. By virtue of the design, the desired HIC score can be achieved independent of the material selection because the cross-section can be designed to induce fracturing, for example, by the inclusion of notches formed within the energy absorber. For instance, an energy absorber made of magnesium may be designed such that it does not need as many notches as an energy absorber made of aluminum, because the tendency to fracture of the two different material differs.

In FIGS. 1-3, the tunable energy absorber 200 includes an exemplary embodiment of an involuted, multiply-connected structure, which has a first wall portion 302 operatively attached to the inner surface of the inner panel 108 of the hood panel 106 and a second wall portion 304. As shown in FIG. 3, the second wall portion 304 may be proximate to the object 104, 105. A pair of opposed, curved connector portions 306 joins the first wall portion 302 and the second wall portion 304. At least one or more of the connector portions 306 is configured to define an involuted curve 312. The term "involuted" as used herein refers to a curve that curves inwardly within the cross-sectional geometry of the absorber. The involuted curve 312 of connector portions 306 provides an energy absorber 200 having an involuted cross-sectional profile. In the examples in FIGS. 1-3, the involuted, curved connector portions 306 are shown having substantially-identical radii, but, in various embodiments, the involuted, curved connector portions 306 may have differing configurations.

As used herein, the term "multiply-connected structure" refers to structures or bodies, as is shown in FIG. 3, wherein a mathematical circuit 310 drawn along the cross section of the body cannot be reduced to a point because the body includes one or more holes such that the mathematical circuit 310 encounters an interior wall (or walls) of the absorber that bounds the hole (or holes). In contrast, a "singly-connected structure" refers to a structure or body in which any mathematical circuit drawn within the cross section of the body can be reduced to a single mathematical point. The response of singly connected structures to impact loads such as those that occur in an impact with a vehicle hood assembly is different than the response of multiply connected structures.

As a general rule, multiply-connected structures have holes 308, while singly-connected structures do not. Illustrative examples of cross-sectional shapes that are multiply connected include, without limitation: ovals, boxes, and figure eights. The topology of multiply-connected structures renders their structural response, (i.e. the manner in which they absorb and subsequently dissipate energy), during impact completely different from the structural response of singly-connected bodies.

The multiply-connected structure is formed integrally as a unitary body. The tunable energy absorber 200 can be easily produced, for example, by an extrusion process (FIG. 9), 3D printing, forging, machining, casting, etc. The energy absorber 200 can be made of a material, such as magnesium, aluminum, steel, alloys thereof, other metallic materials, high temperature polymeric materials, or other extruded materials. An exemplary list of some suitable high-temperature polymers includes polyamides (e.g. Nylon®), polyphenylene sulfide (PPS) and polyethersulfone (PES).

The extrusion process is employed to create an elongated, extruded energy absorber having a fixed cross-sectional profile. The material is pushed through a die into a desired cross-sectional configuration as depicted in FIG. 9.

The extrusion process may be continuous to produce indefinitely long material or semi-continuous to produce many pieces. In the preferred embodiment, the extrusion process produces long lengths of extruded materials, resulting in an elongated extruded energy absorber 200, as shown in FIGS. 1-3. In some embodiments, the energy absorbers can be approximately 3-5 inches.

According to the present disclosure, the energy absorbers are substantially tubular structures with complex cross-sectional profiles that can be manipulated via an extrusion process, as depicted in FIG. 9, so as to render the energy absorbers both multiply-connected and material-independent for the purpose of achieving a desired HIC score. For example, in some embodiments the desired HIC score may be approximately ≤1000. In other embodiments, the desired HIC score may be ≥1000. The tubular absorbers can be manufactured having different cross-sectional profiles to achieve the desired HIC score values. Thus, extremely light weight (e.g. aluminum or magnesium alloy), non-flammable, tubular-shaped absorbers with a variety of cross-sectional profiles can be produced, for example, via extrusion.

The energy absorbers are tunable because extrusion dies can easily be produced that result in a variety of cross-sectional profiles. By manipulating the structural connectivity of the extruded absorbers and/or the absorber cross sectional geometry, their resultant characteristics can be tuned to resemble the curve of the proposed deceleration-time profile of Wu and Beaudet, cited above. The cross-sectional profiles of the energy absorbers can be manipulated during the extrusion process to be doubly or triply (or more) connected so as to achieve a desired curve of the proposed deceleration-time profile.

The extrusion process can be performed with the material substantially hot or warm. In one example of a high-elevated temperature application using magnesium, the magnesium can be refined by inducing a high temperature transformation such that it becomes a recrystallized microstructure, for example, which is substantially devoid of twins. One benefit of employing magnesium and/or magnesium alloys is that magnesium alloys are the lowest density structural metal alloys that will add minimal mass to a vehicle hood assembly relative to more mass-intensive aluminum and steel alloys. Additional advantages of magnesium are high specific strength, high specific stiffness, good damping capacity, and machinability.

In reference to FIGS. 1-3, the energy absorber 200 is shown and described herein on the vehicle hood assembly 102. However, the energy absorber 200 may also be used to reduce the effects of impacts to other exterior panels or portions of the vehicle 100. For example, and without limitation, the energy absorber 200 may be located adjacent to: fenders, bumpers, quarter panels or hood assembly hood latches. Note also that small holes placed in the energy absorber 200, such as holes in the first wall portion 302 for attachment to the outer panel 109 or inner panel 108, would not destroy the multiply-connected nature of structure, because the response to impact loading would be substantially unaffected by the holes.

In the vehicle hood assembly 102 shown in FIGS. 1-3, the first wall portion 302 and the second wall portion 304 of the tunable energy absorber 200 are substantially parallel with each other and the inner surface of inner panel 108 and the outer panel 109. As used herein, substantially parallel refers to the panels being within fifteen degrees of parallel, plus or minus. However, some embodiments may be configured with the first wall portion 302 and the second wall portion 304 even closer to parallel, such as within five or fewer degrees of parallel.

Under sufficient impact load 204, the vehicle hood assembly 102 deforms and the tunable energy absorber 200 which is affixed to the inner panel 108 in FIGS. 2 and 3 moves from the position shown in FIG. 3 toward the object 104, 105. After the second wall portion 304 impacts either hard object 104 or 105 the energy absorber 200 begins deforming. As the energy absorber 200 deforms while it is crushed, it absorbs energy from the impact load 204 and slows it down. In the absence of the absorber 200, the maximum deceleration, and hence the maximum force, experienced by the impacting body 205 is much greater as it has a higher speed when it contacts the hard object 104 and/or 105.

The multiply-connected structure of the tunable energy absorber 200 has a different deformation response than a singly-connected structure. Deformation without fracture occurs while the strain and displacement of the structures remain compatible. The conditions for a compatible response to loading are dramatically different for multiply-connected structures and singly-connected structures. The requirement that these structures maintain compatibility of strain and displacement for non-fracture deformation is the reason why multiply-connected and singly-connected structures respond to loading so differently.

Many structures are configured to avoid fracture during deformation, but the multiply-connected structure of the energy absorber 200 may be configured to fracture in response to the impact load 204 being above a threshold load. Fractures are violations of compatibility between the strain and displacement within the tunable energy absorber 200.

Fracturing the energy absorber 200 enables dissipation of energy from the impact load 204 by opening up new surfaces in one or both of walls 302, 304 and/or an involuted portion 312 of the curved connector portion 306. When the energy absorber 200 is compressed against a hard object 104, 105, one or more cracks eventually develop after initial impact, leading to crack or fracture propagation. Fracture may occur along one or both of the curved connector portions 306 such that much of the energy dissipated by the energy absorber 200 occurs through plastic deformation and/or fracture of one or both of the curved connector portions 306, and/or along one or more of the absorber walls 304 or 302.

In various embodiments, a tunable energy absorber of a wide variety of multiply-connected configurations may be accomplished using the same extrusion process since virtually unlimited numbers of cross sectional shapes can be produced through suitable design of extrusion dies, and then employed to meet the specific HIC score. The energy absorbers may take any desired cross-sectional shape having a multiply-connected configuration. A general discussion of various exemplary absorbers having involuted shapes will be provided with reference to FIGS. 1-6B. Then, energy absorbers having non-involuted or exvoluted or outwardly curved shapes will be described with reference to exemplary embodiments of FIGS. 7A-8.

The energy absorbers may thus be designed to be responsive to various initial design parameters of the extrusion process. For example, the design parameters may include information regarding impact thickness, fracture radius thickness, base thickness, fracture radius, attack angle, profiles of the side walls, top wall and bottom wall, profiles of the hood attachment surface, the hard object, and notches and/or indentations. These exemplary design parameters will be described in further details below in reference to FIG. 4. Since the HIC score may also respond to such parameters, the energy absorbers may be made tunable by changing the characteristics of these parameters to achieve the desired HIC score. Control of the cross-sectional geometry by varying one or more of these parameters provides a tunable energy absorber. The tunable energy absorbers can be produced in a single step by an extrusion process. The tenability is easily controlled by changing one or more of the design parameters during the manufacturing process, such as an extrusion process, to produce a desired multiply-connected structure.

The input parameters of the extrusion process may be selected according to predetermined criteria. For example, the input parameters of the extrusion process may be chosen by experimentation, CAE simulation, and/or expert opinions. In certain embodiments, the input parameters may be selected based on the HIC formula, as represented above.

A desired set of values of the tunable energy absorber input parameters may be selected such that an optimized HIC score is achieved.

The plastic deformation and fracture of a tunable energy absorber affects the energy absorption properties of the vehicle hood assembly 102 and the maximum deceleration experienced by the impacting object 205. The energy absorber and the vehicle hood assembly 102 cooperate to absorb energy when sufficient force is applied to deform the tunable energy absorber such that it plastically deforms and fractures. The tunability of the energy absorbers results from the adjustment of the various dimensions of the above exemplary design parameters. Plastic deformation and fracture of a tunable energy absorber enable a drop in the contract force between the impacting object 205 and the vehicle hood assembly 102 and a corresponding drop in deceleration experienced by the impacting object 205. Plastic deformation and fracture of the tunable energy absorbers thereby result in the desired low HIC scores, because the associated deceleration vs. time profile substantially resembles that prescribed by J. P. Wu and B. Beaudet.

Figure 4:
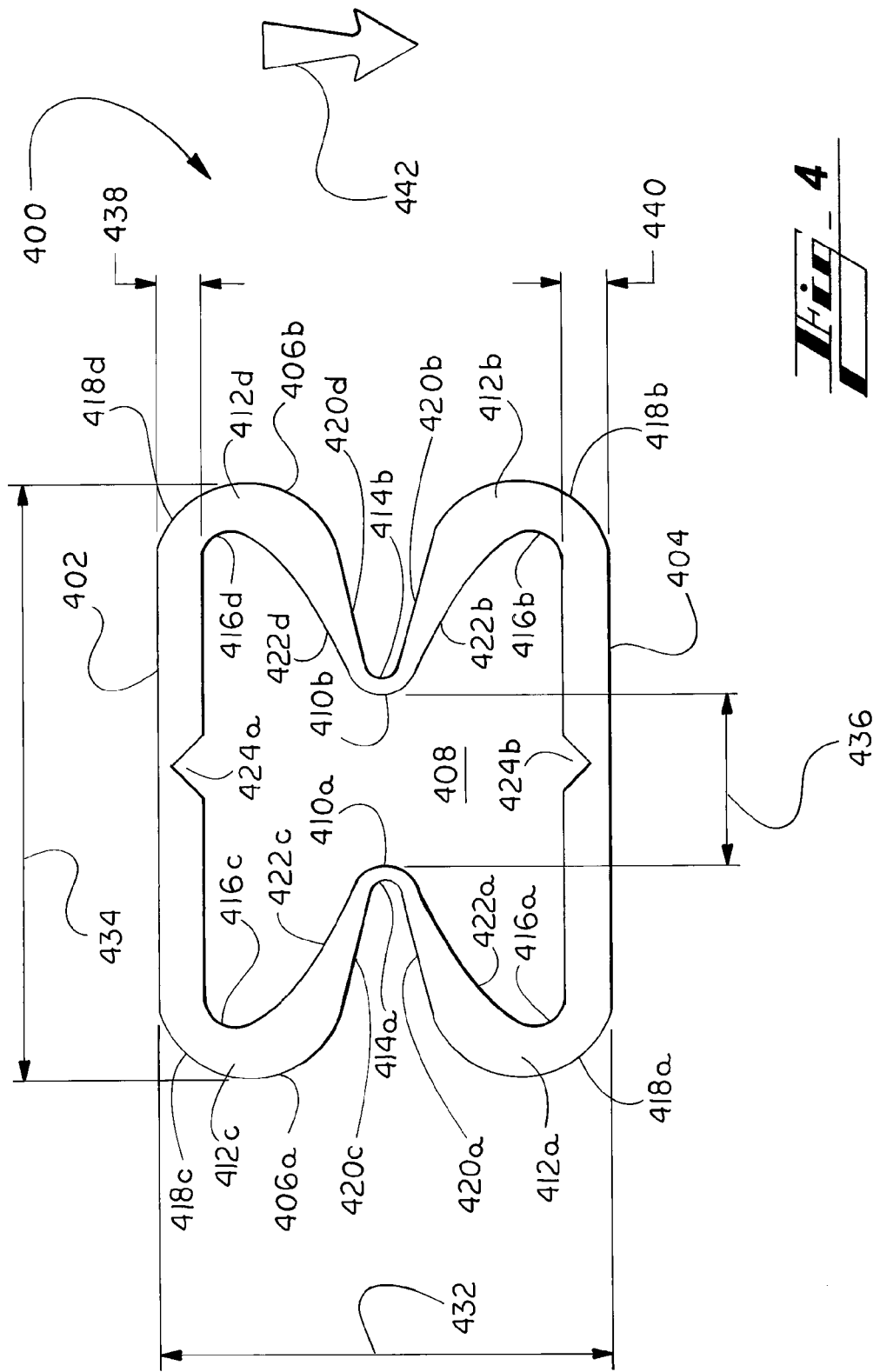
FIG. 4 is another view of another tunable energy absorber formed as a multiply-connected structure with varied properties along the body of the absorber.

An energy absorber that has been tuned during the manufacturing process to produce an extruded structure having an involuted cross-section will now be described with reference to FIG. 4. The exemplary embodiment of an energy absorber in FIG. 4 illustrates an involute absorber 400, such as the examples shown in FIGS. 1-3. Involute absorber 400 consists of a shape that is comprised of a series of arcs, conics and straight lines. One of the underlying principles of the design of the involuted absorbers is the fact that each involuted absorber maintains tangency of all arcs so as to avoid discontinuities in the local slope around the circumference of the shape (i.e. no cusps). The tunability of the involuted absorbers results from the adjustment of one or more of the above-listed exemplary design parameters to produce various dimensions of the arcs, conics and straight lines so as to enable a drop in the contact force between the impacting object 205 and the vehicle hood assembly 102 and a corresponding drop in the deceleration experienced by the impacting object 205 during contact with object 104 and/or object 105.

Referring to FIG. 4, the involuted energy absorber 400 includes an extruded structure having an opposite first wall portion 402 and a second wall portion 404 spaced apart from one another. Either the first wall portion 402 or the second wall portion 404 can be affixed or adhered to various positions within the hood assembly 102 such that it is positioned above the hard object 104, 105 via an adhesive bond or a welded bond 202 in FIG. 3 or other fastening techniques.

A pair of opposed, curved connector portions 406a, 406b joins the first wall portion 402 and the second wall portion 404. In this exemplary embodiment, both connector portions 406a, 406b are configured to define respective involuted curves 410a, 410b. Four corners 412a, 412b, 412c, 412d are formed, respectively, where the curved connector portions 406a, 406b intersect the first wall portion 402 and the second wall portion 404 to form a continuous extruded structure. The continuous extruded structure defines a hole or an open cavity 408 that extends through the cross-sectional geometry.

The first wall portion 402 and the second wall portion 404 can have an overall width 434. In this exemplary embodiment, the overall width of the first wall portion 402 and the second wall portion 404 are substantially identical. However, in various embodiments, the first wall portion 402 and second wall portion 404 may have differing configurations. In this example, the overall width 434 of the first and second wall portions is approximately 50 mm. In some embodiments, the overall width 434 can range from about 25 mm to about 75 mm. The overall height 432 of the energy absorber 400 is dictated by the basin distance 206 or 207 (FIG. 3) between the hood and the hard object 105.

The energy absorber 400 has impact thicknesses 438, 440 which are the thicknesses of the flat portions of the respective first wall portion 402 and second wall portion 404. The impact thicknesses 438, 440 are in a range of 1 mm to about 3 mm. In some embodiments, the impact thickness 438 of the first wall portion 402 is substantially identical to the impact thickness 440 of the second wall portion 404. In other embodiments, the impact thickness 438 may differ from the impact thickness 440.

The energy absorber 400 can be adhered or bonded to the hood such that it is positioned within a small distance relative to the hard object 104, 105 in the vehicle, similar to energy absorber 200 shown in FIG. 3. When the energy absorber 400 is affixed within the vehicle, during an impact, the impact force of the impact object 205 is transmitted to the first wall portion 402 which translates with the vehicle hood assembly 102 along the Y-direction 442, as indicated in FIG. 4 until second wall portion 404 of the energy absorber contacts the object 104 or object 105.

Due to the thickness 438 of the first wall portion 402, the impact force is transmitted initially to the two corners, 412c and 412d, when the energy absorber 400 contacts the hard object 104 and/or hard object 105. Each of the four corners 412a, 412b, 412c, 412d is designed to form a stiff corner by being designed stiffer than other regions in the energy absorber 400 by shaping the cross-sectional thickness of the absorber to gradually increase from the thickness of the flat portion of the first wall portion 402 extending around each corner 412c and 412d, wherein the thickness achieves a maximum value for the absorber, and then the thickness decreases once again to its thinnest value at the "involute" sections, 410a and 410b with radii 414a and 414b, respectively.

During the impact, the spatial rate at which the thickness 438 changes through corners 412c and 412d is controlled by the interior wall radii 416c and 416d, outer wall radii 418c and 418d, the outer arcs 420c and 420d, and the inner arcs, 422c and 422d. Similarly, the spatial rate at which the thickness 440 changes through 412a and 412b is controlled by the interior wall radii 416a and 416b, the outer wall radii 418a and 418b, the outer arcs 420a and 420b, and the inner arcs, 422a and 422b. In the exemplary embodiment, FIG. 4 depicts four interior radii 416a, 416b, 416c, 416d, four outer arcs 420a, 420b, 420c, 420d, and four inner arcs 422a, 422b, 422c, 422d. However, those skilled in the art would recognize that an energy absorber in accordance with the present teachings may encompass a wide variety of configurations and shapes so as to achieve the desired HIC score.

The transfer of the load during impact and the resulting contact of the second wall portion 404 with the object 104 and/or object 105 creates a severe bending moment that is transferred to the weakest "involute" sections, 410a and 410b as the absorber is crushed, to initiate fracture at these locations (i.e. along the curved regions of 410a and 410b) if desired. The severity of the fracture is mitigated by the fracture radii 414a and 414b of the "involute" sections, 410a and 410b.

In various embodiments, for example as shown in FIG. 4, notches 424a and 424b can be provided within one or more surfaces of the tunable energy absorber 400 to further promote fracture. For example, notches 424a and 424b (which face the substantially open cavity 408 of the absorber) can be introduced during the extrusion process. The notch depth can vary from 5% to 50%. The variations in height tend to form a valley within the thickness of the energy absorber. The energy absorber 400 may include one or more valleys, and the notch may essentially correspond to a valley. The notch can be formed, for example, as a substantially V-shaped groove formed in an internal surface or an external surface of the energy absorber. Thus, the extrusion process can be used to form various configurations such as notches, grooves or other indentations into a surface of the energy absorber 400. In lieu of the V-shape, the notches, grooves or indentations in accordance with various exemplary embodiments may have various configurations, such as, for example, a semi-circular or hemispherical shape.

In various embodiments, interior radii 416a, 416b, 416c, and 416d are identical or different, the outer radii 418a, 418b, 418c, and 418d are identical or different, inner arcs 422a, 422b, 422c, and 422d are identical or different, and the outer arcs 420a, 420b, 420c, and 420d are identical or different. The interior radii 416a, 416b, 416c, 416d will typically be in the range of about 0.5 mm to about 4 mm. The outer radii 418a, 418b, 418c, 418d may fall within the range of approximately 4 mm to approximately 8 mm. The dimensions of the arcs and radii are affected by the open space length 436, disposed as the horizontal distance between the involuted sections, 410a and 410b. In some embodiments, the open space length 436 can vary from approximately 5 mm to approximately 30 mm. In various embodiments, a connecting bridge 670 (FIG. 6B) or span of material can be interdisposed within the open length space 436.

Referring now to FIG. 5, and with continued reference to FIGS. 1-4, there is shown an alternative configuration of a tunable energy absorber 500, which may also be attached to various positions on the hood assembly 102, on a surface of the outer panel 108, or on a surface of the inner surface 109. As shown in FIG. 5, tunable energy absorber 500 includes a multiply-connected structure having a first wall portion 502, a second wall portion 504, and a pair of curved connector portions 506 having an involuted section 510. Features and components shown in other figures may be incorporated and used with those shown in FIG. 5, and components may be mixed and matched between any of the configurations shown.

The multiply-connected structure of the tunable energy absorber 500 defines an open cavity 508. Unlike the configuration shown in FIGS. 1-4, the tunable energy absorber 500 shown in FIG. 5 includes a crushable core member 512 disposed within the open cavity 508. The crushable core member 512 may be, for example and without limitation, foam, honeycomb, or an envelope filled with gel or crushable pellets. The crushable core member 512 may have different cross-sectional shapes, such as, without limitation: rectangular, semi-circular (one-half of a circle), elliptical, or polygonal cross-sections. In alternative embodiments, the crushable core member 512 can substantially fill the entire open cavity 508. Furthermore, when the crushable core member 512 is smaller in cross section than the open cavity 508, the crushable core member 512 may be attached or bonded to any of the inner surfaces of the first wall portion 502, one or more of the curved connector portions 506, the second wall portion 504, or portions of multiple elements. The crushable core member 512 can be included within any tunable energy absorber described herein.

The crushable core member 512 further dissipates energy from the impact load 204 to the tunable energy absorber 500. Therefore, the crushable core member 512 may further assist in managing impacts between the impact object 205, the hood panel 106 and the hard object 104 or 105. The crushable core member 512, or similar crushable core structures, may be incorporated into any of the other tunable energy absorbers shown and described herein.

Note that even though the crushable core member 512 may be disposed within the tunable energy absorber 500, the tunable energy absorber 500 still has a multiply-connected structure. In the tunable energy absorber 500 shown in FIG. 5, the multiply-connected structure is formed from composite materials, such as carbon fiber or fabrics, aramid fibers or fabrics, and resin matrix. Fracture of the composite materials, combined with internal deformation, fracturing, or both, of the crushable core member 512, dissipates impact energy, and may reduce the HIC score relative to embodiments without the tunable energy absorber 500. The crushable core member 512 may also be used with tunable energy absorbers 500 formed from metal alloys and various exemplary materials mentioned above.

Furthermore, the composite materials may allow the tunable energy absorber 500, and particularly the curved connector portions 506, to move substantially directly between elastic and fracture deformation, as opposed to aluminum (having substantial intermediate plastic deformation) or magnesium (having less, but some, intermediate plastic deformation). The crushable core member 512 provides a visco-elastic or visco-plastic deformation which is time-dependent, such that the crushable core member 512 acts as a damping entity for the tunable energy absorber 500.

Referring now to FIG. 6A and FIG. 6B, and with continued reference to FIGS. 1-5, there are shown two cross-sectional views of alternative tunable energy absorbers. Each of the tunable energy absorbers shown may be used with hood panels similar to that shown in FIGS. 1-3. Features and components shown in other figures may be incorporated and used with those shown in FIGS. 6A-6B, and components may be mixed and matched between any of the configurations shown.

FIG. 6A shows a schematic, cross-sectional view of a tunable energy absorber 630 formed from a multiply-connected structure. The tunable energy absorber 630 is a multiply-connected structure, and includes a first wall portion 632 operatively attached to a hood panel (not shown) and a second wall portion 634 distal from the first wall portion 632.

In this exemplary embodiment, the first wall portion 632 is formed with a convex surface 638. While, the second wall portion 634 is formed with a concave surface 640 corresponding to the curvature of the radius of the convex surface 638 of the first wall portion 632. However, in various embodiments, the radius of the curvature of the first wall portion 632 and the second wall portion 634 may vary between each other. In certain embodiments, either the first wall portion 632 or the second wall portion 634 may be formed with one or more concave portions, one or more convex portions, or a combination thereof A pair of curved connector portions 636 joins the first wall portion 632 and the second wall portion 634. Each curved connector portion 636 is generally curved to form an involuted section 642 having a width 644 and a depth 646, as shown in the enlarged sectional view of FIG. 6A. Each curved connector portion 636 in FIG. 6A is illustrated having one involuted section 642; however, each curved connector portion 636 may have more involuted sections 642. Additionally, each involuted section 642 shown in FIG. 6A has the same width 644 and depth 646. However, the width 644 and/or depth 646 may vary between each involuted section 642. Thus, the size and shape of the involuted section 642 may vary depending on the particular application of the tunable energy absorber 630.

The entire surfaces of the first wall portion 632 and the second wall portion 634 are generally not parallel to the hood panel. A portion of the surfaces of the first wall portion 632 and the second wall portion is attached the hood panel.

FIG. 6B shows a schematic, cross-sectional view of a tunable energy absorber 660 formed from a multiply-connected structure. Unlike the other multiply-connected bodies shown, the tunable energy absorber 660 has a connecting bridge or span of material 670 that defines two open cavities 672a, 672b.

The tunable energy absorber 660 includes a first wall portion 662 operatively attached to a hood panel (not shown) and a second wall portion 664 distal from the first wall portion 662. A pair of curved connector portions 666 joins the first wall portion 662 and the second wall portion 664.

As shown in FIG. 6B, each curved connector portion 666 is generally curved to form an involuted section 668 having a width 674 and a depth 676, as shown in the enlarged sectional view of FIG. 6B. In various embodiments, the width 674 and the depth 676 may be identical or have differing configurations. Each curved connector portion 666 may include one or more involuted sections 668.

In various embodiments of FIGS. 6A and 6B, the tunable energy absorbers 630, 660 can be formed through an extrusion protrusion process such that the tunable energy absorbers have varied properties. For example, one or more surfaces of the tunable energy absorbers 630, 660 can be formed having one or more notches as described above, but not shown in FIGS. 6A and 6B. For example, notches can be formed in an internal surface, external surface, involuted section, and/or connecting bridge section.

In lieu or in addition to incorporating at least one notch into the tunable energy absorber 630, 660, another example is that the thickness of one wall portion may or may not be substantially different from the thickness of another wall portion. As used when referring specifically to the thickness, the term "substantially different" refers to differences in dimension that are beyond those of ordinary manufacturing variability. For example, an energy absorber extruded into a desired shape may vary in thickness between 1.0 to 1.1 millimeters due to variability in the forming process. This variability would not amount to being configured with a substantially different second thickness. However, if the walls of the desired shape have a first thickness of 1.0 mm but another portion has a second thickness of 3.0 mm, then the second thickness would be substantially different than the first thickness.

Incorporating substantially different thicknesses into the tunable energy absorber 630, 660 may allow tuning of the response characteristics—specifically, of the accumulation of strain energy—of the tunable energy absorber 630, 660 under impact loads (not shown). For example, the first wall portion 632, 662, respectively, may elastically deform under some loads that plastically deform one or more of the curved connector portion 636, 666, respectively, or vice versa.

As an alternative to incorporating at least one notch or varying the thickness of the tunable energy absorber 630, 660, or in addition to varying the thickness, the tunable energy absorber 630, 660 may include other varied properties along its length. For example, the first wall portion 632, 662, respectively, may be configured with a first rigidity under the impact loading. One or more of the curved connector portion 636, 666 may be configured with a second rigidity under impact loading, and the second rigidity may be substantially different from the first rigidity.

Varied levels of rigidity throughout cross sections, or in different lengthwise regions, of the tunable energy absorber 630, 660 may be achieved by locally varying heat treatment of metals forming the tunable energy absorber 630, 660. For example, the curved connector portion may be annealed to reduce rigidity relative to the first wall portion and the second wall portion. Furthermore, the properties may be varied along the length of the energy absorber, such that, for example, the center section is softer than the end sections.

Varied rigidity may also be achieved by changing the structure of composite materials forming the energy absorber 630, 660. For example, the ends of the tunable energy absorber 630, 660 may have unidirectional glass reinforcement members added to the composite structure to increase the stiffness and rigidity of the ends.

Figure 7A:
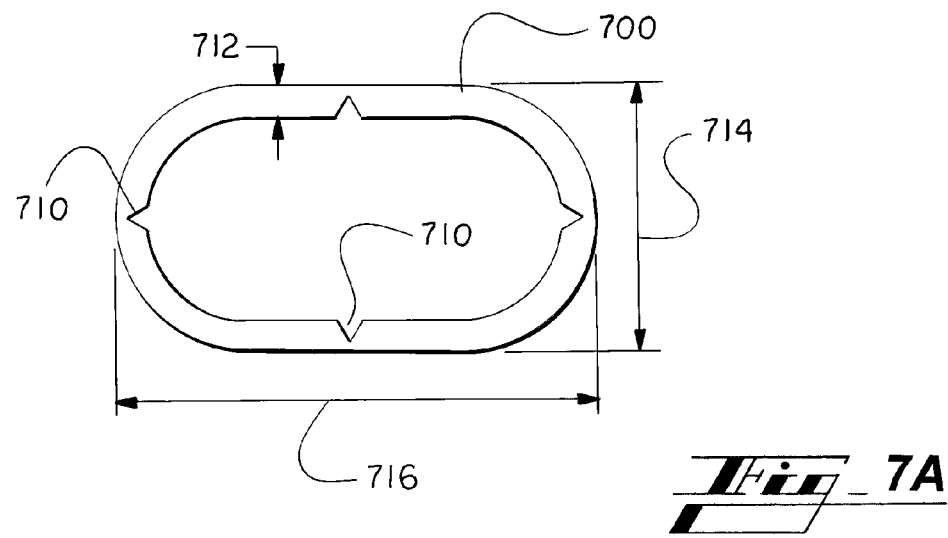
FIG. 7A is a front, cross-sectional view of a non-involuted or an exvoluted tunable energy absorber according to another embodiment of the present teachings.
Figure 7B:
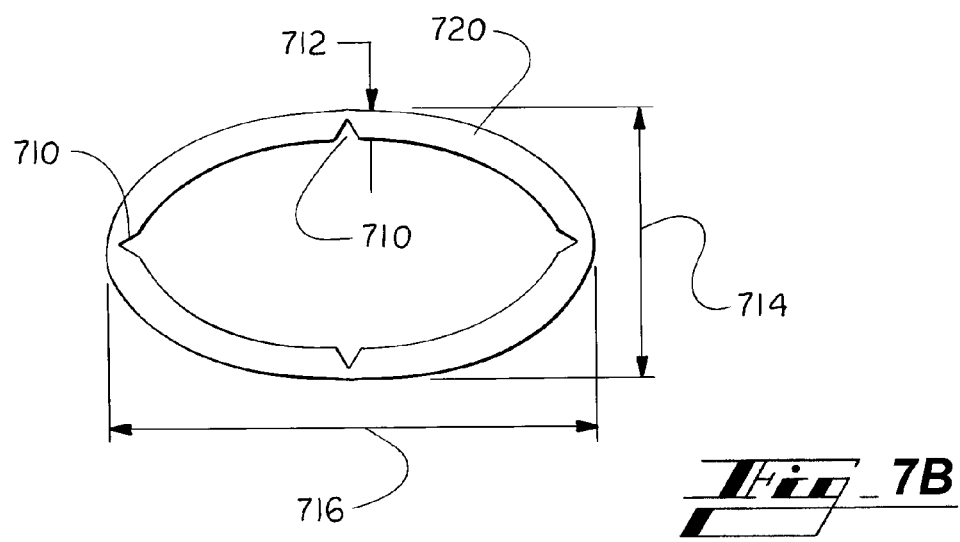
FIG. 7B is a front, cross-sectional view of another non-involuted or exvoluted tunable energy absorber according to yet another embodiment of the present teachings.
Figure 7C:
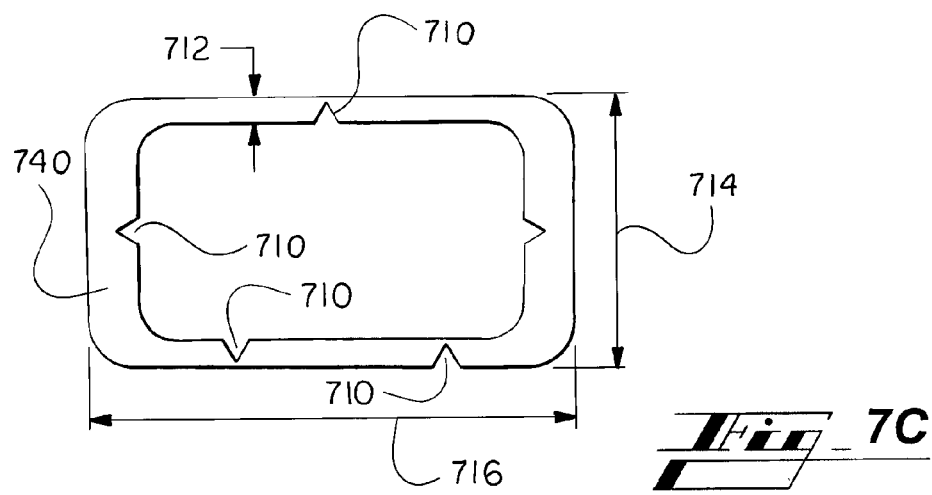
FIG. 7C is a front, cross-sectional view of a further non-involuted or exvoluted tunable energy absorber according to yet another embodiment of the present teachings.

Referring now to FIG. 7A, FIG. 7B, FIG. 7C and FIG. 8, exemplary embodiments of energy absorbers 700, 720, 740, 760 having non-involuted or exvoluted or outwardly curved shapes are illustrated. In FIGS. 7A-7C, there are shown tunable energy absorbers 700, 720, 740 having a relatively simple configuration and formed as a multiply-connected structure. In FIG. 8, there is shown a schematic, isometric view of another tunable energy absorber 760 having a simple configuration and formed as a multiply-connected structure. The tunable energy absorber 700, 720, 740, 760 may be attached between a hood panel (not shown) and a hard object (not shown) to dissipate energy transferred between impact objects (not shown) and the hard object. Features and components shown in other figures may be incorporated and used with those shown in FIGS. 7A-7C and 8, and components may be mixed and matched between any of the configurations shown.

The tunable energy absorber is not limited to any particular shape or configuration. In the illustrated embodiments, for example, shown in FIGS. 7A, 7B and 8, the tunable energy absorbers 700, 720, 760 have a simple oval shape. In FIG. 7C, the tunable energy absorber 740 has a simple rectangular shape. One skilled in the art will readily appreciate, however, that other geometries may also be suitable, including, for example, ovoid-like, elliptical, trapezoidal, circular-like, triangular, square-shaped, diamond-shaped or a variety of combinations thereof. The geometry of the tunable energy absorbers including the height 714, width 716, and thickness 712 may affect the HIC score of the tunable energy absorbers 700, 720.

In addition, one or more notches 710 can be formed within one or more surfaces of the tunable energy absorbers 700, 720, 740, 760 to further promote fracture. For instance, one or more notches 710 can be formed within an internal surface, external surface or combination thereof. In the exemplary configurations of the tunable energy absorbers 700, 720, 740, 760, the notches 710 have a substantially V-shape. The notch 710 weakens the sidewall of the tunable energy absorbers, due to the fact it represents a stress concentration. Because the notch 710 locally weakens the wall, fracture is more likely to occur at the notch and grow along the notch 710.

As shown in the exemplary embodiment of FIG. 9, notches 910 can be produced during the extrusion process. In the exemplary embodiment in FIG. 9, the extrusion process is employed to create an elongated, extruded energy absorber having a fixed cross-sectional profile. The material is pushed through a die 902 into a desired cross-sectional configuration as depicted in FIG. 9. Notches 910 can be formed such that they extend along the entire length of one or more surfaces of the tunable energy absorber 900. For example, in an energy absorber having an involuted shape, notches may be formed within any internal and/or external surface, including at one or more of the involuted sections. In another exemplary embodiment of an energy absorber having non-involuted or exvoluted or outwardly curved shapes, one or more notches 910 can be formed in any internal surface, external surface or a combination thereof. While extrusion is the manufacturing method described in reference to and illustrated in FIG. 9, other methods such as machining, forging, casting, and 3D printing can also be used to produce a variety of tunable energy absorbers according to the present teachings.

FIGS. 10A-10C demonstrate the deformation and fracturing process of an energy absorber 1000 during an impact of an impact object 1012 with a vehicle hood forcing the energy absorber 1000 to impact a hard object 1020 under the hood. In FIG. 10A, the hood assembly is not shown for clarity. In FIG. 10A, an energy absorber 1000 having an involuted shape and at least one notch formed in at least one surface of the absorber is inserted within the hood section of the vehicle 1010. It is understood that, in various embodiments, one or more energy absorbers having an involuted shape or exvoluted or outwardly curved shape may be inserted at various locations within the hood section such that it undergoes a similar deformation and/or fracturing process as described herein with regards to FIGS. 10A-10C. In some embodiments, the energy absorber may have an involuted shape including no notch or at least one notch. In other embodiments, the energy absorber may have an exvoluted or outwardly shape including one or more notches.

FIG. 10B depicts the fracture 1020 of the tunable energy absorber 1000*a* along the flat portion 1014 due to the presence of the notch 1016*a*. In FIG. 10 B, some fracture of the tunable energy absorber 1000*b* occurs along the one involuted region 1018*a*. FIG. 10C depicts fracture primarily along the involuted regions 1018*b*.

When a force from the impact 1012 is transferred to an energy absorber 1000 having an involuted section 1018 with a notch 1016, as shown in FIG. 10A, the force creates a bending moment that spreads the notch apart. By virtue of the fact that the sidewall thickness of the extruded structure of the energy absorber 1000 is reduced at the notch 1016, a crack opens that grows through the wall thickness, and along the wall thickness. The additional fracture process dissipates energy thereby changing not only the temporal position of the peak deceleration point, but the nonlinear portion of the curve that substantially follows the peak deceleration point according to the deceleration-time profile proposed by Wu and Beaudet, cited above such that HIC score is lowered below what it would be without the notch or notches in the absorber.

Arranging multiple notches spaced at a specific interval can enhance this effect, especially for materials that are not as prone to fracture as magnesium (as is the case for aluminum). Therefore, the inclusion of the notches enables "tuning" of the "non-linear energy dissipation" region in the deceleration-time profile proposed by Wu and Beaudet so as to achieve a desired low HIC score. The tuning occurs by enabling a necessary amount of strain energy dissipation via the creation of more fracture surface. Thus, tuning through the addition of one or more notches can cause the deceleration vs. time profile decay to be faster than it otherwise would occur in this "non-linear energy dissipation" region.

FIG. 11 is a graph illustrating a comparison between the deceleration time history for a simulated impact on a hood with an involuted tunable energy absorber and a baseline case of the same hood without the energy absorber. The graph 1100 includes a y-axis 1106 showing the deceleration in gravitational force (G's). An x-axis 1108 shows time lapse in milliseconds (ms).

HIC scores from some of these tests conducted were calculated and are included herein. However, note that the HIC scores are illustrative only and are not intended for any purpose other than illustrating relative differences between testing samples plotted as curve 1102 of a tunable energy absorber having an involuted shape and a curve 1104 of a baseline hood having no energy absorber. On the curve 1102, the tunable energy absorber having an involuted shape achieved a HIC score of approximately 950. On the curve 1104, the baseline hood achieved a HIC score of approximately 2680.

The tunable energy absorber of curve 1102 was formed as an extruded structure having a cross-sectional profile. At least one hollow profile was formed within the extruded structure. The cross-sectional profile of the extruded structure was configured based on a deceleration profile of an object impact as a function of time. The deceleration profile includes a first period 1110 and a second period 1112. The first period 1110 is characterized by a relatively sharp and linear increase in the magnitude of the deceleration up to a maximum value 1114, for example, which is typically less than 180 g, while the second period 1112 is characterized by a rapid decay in the magnitude of the deceleration.

CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A vehicle panel, comprising:
an inner surface for facing an object and being offset from the object in use of the vehicle panel;
an outer surface substantially opposite the inner surface; and
an energy absorber disposed, for use of the vehicle panel, between the inner surface and the object, and comprising a structure having a cross-sectional profile forming a hollow;
wherein the cross-sectional profile of the structure comprises a substantially involuted cross-sectional profile.

2. The vehicle panel of claim 1, wherein the substantially involuted cross-sectional profile comprises at least one involuted surface configured to release accumulated elastic strain energy through one or both of plastic deformation and fracture during the impact.

3. The vehicle panel of claim 2, further comprising at least one indentation in the at least one involuted surface to promote fracture during the impact.

4. The vehicle panel of claim 2, further comprising at least one indentation in at least one of an internal surface and an external surface of the structure.

5. The vehicle panel of claim 1, wherein the hollow defines a closed cavity and the vehicle panel further comprises at least one crushable core member disposed within the closed cavity.

6. The vehicle panel of claim 1, wherein the hollow defines a closed cavity and the vehicle panel further comprises at least one crushable core member disposed within the closed cavity.

7. The vehicle panel of claim 1, wherein a shape of the cross-sectional profile is configured based on a deceleration-time profile comprising:
a first period defined by an increase in magnitude of the deceleration of an impact until a maximum deceleration value is achieved; and
a second period defined by a decrease in the magnitude of the deceleration.

8. The vehicle panel of clam 7, wherein:
construction of the cross-sectional profile of the structure comprises at least one characteristic selected so that the deceleration-time profile is met; and
the at least one characteristic includes one or more of an impact thickness, a fracture radius thickness, a base thickness, a fracture radius, an attack angle, a profile of a wall of the structure, a profile of an attachment surface, the object, and an indentation at the structure.

9. A vehicle hood, comprising:
an inner surface for facing an under-hood vehicle object and being offset from the object in use of the vehicle hood;
an outer surface substantially opposite the inner surface; and
an energy absorber comprising a structure having a cross-sectional profile forming a hollow;
wherein the desired cross-sectional profile of the structure comprises a substantially involuted cross-sectional profile.

10. The vehicle hood of claim 9, further comprising at least one indentation in at least one involuted surface to promote fracture during the impact.

11. The vehicle hood of claim 9, wherein the hollow defines a closed cavity and contains at least one crushable core member disposed within the closed cavity.

12. The vehicle hood of claim 9, wherein the cross-sectional profile comprises a non-involuted cross-sectional profile or an exvoluted cross-sectional profile and at least one indentation in at least one non-involuted surface or exvoluted surface to promote fracture during the impact.

13. The vehicle hood of claim 12, wherein the at least one hollow defines at least one closed cavity and contains at least one crushable core member disposed within the at least closed cavity.

14. The vehicle hood of claim 9, wherein a shape of the cross-sectional profile is configured based on a deceleration-time profile comprising:
   a first period defined by an increase in magnitude of the deceleration of an impact until a maximum deceleration value is achieved; and
   a second period defined by a decrease in the magnitude of the deceleration.

15. The vehicle hood of claim 14, wherein:
   construction of the cross-sectional profile of the structure comprises at least one characteristic selected so that the deceleration-time profile is met; and
   the at least one characteristic includes one or more of an impact thickness, a fracture radius thickness, a base thickness, a fracture radius, an attack angle, a profile of a wall of the structure, a profile of an attachment surface, the object, and an indentation at the structure.

16. A vehicle panel, comprising:
   an inner surface for facing an object and being offset from the object in use of the vehicle panel;
   an outer surface substantially opposite the inner surface;
   an energy absorber disposed, for use of the vehicle panel, between the inner surface and the object, and comprising a structure having a cross-sectional profile forming a hollow; and
   at least one indentation in at least one of an internal surface and an external surface of the structure.

17. The vehicle panel of claim 16, wherein the cross-sectional profile comprises a non-involuted cross-sectional profile or an exvoluted cross-sectional profile.

18. The vehicle panel of claim 16, wherein the least one indentation is in at least one non-involuted surface or exvoluted surface to promote fracture during the impact.

19. The vehicle panel of claim 16, wherein a shape of the cross-sectional profile is configured based on a deceleration-time profile comprising:
   a first period defined by an increase in magnitude of the deceleration of an impact until a maximum deceleration value is achieved; and
   a second period defined by a decrease in the magnitude of the deceleration.

20. The vehicle panel of claim 19, wherein:
   construction of the cross-sectional profile of the structure comprises at least one characteristic selected so that the deceleration-time profile is met; and
   the at least one characteristic includes one or more of an impact thickness, a fracture radius thickness, a base thickness, a fracture radius, an attack angle, a profile of a wall of the structure, a profile of an attachment surface, the object, and an indentation at the structure.

21. A vehicle hood, comprising:
   an inner surface for facing an under-hood vehicle object and being offset from the object in use of the vehicle hood;
   an outer surface substantially opposite the inner surface; and
   an energy absorber comprising a structure having a cross-sectional profile forming a hollow; and
   at least one indentation in at least one involuted surface to promote fracture during the impact.

22. The vehicle hood of claim 21, wherein the cross-sectional profile comprises a non-involuted cross-sectional profile or an exvoluted cross-sectional profile and the indentation is in at least one non-involuted surface or exvoluted surface to promote fracture during the impact.

23. The vehicle hood of claim 22, wherein the at least one hollow defines at least one closed cavity and contains at least one crushable core member disposed in the at least one closed cavity.

24. The vehicle hood of claim 21, wherein a shape of the cross-sectional profile is configured based on a deceleration-time profile comprising:
   a first period defined by an increase in magnitude of the deceleration of an impact until a maximum deceleration value is achieved; and
   a second period defined by a decrease in the magnitude of the deceleration.

25. The vehicle hood of claim 24, wherein:
   construction of the cross-sectional profile of the structure comprises at least one characteristic selected so that the deceleration-time profile is met; and
   the at least one characteristic includes one or more of an impact thickness, a fracture radius thickness, a base thickness, a fracture radius, an attack angle, a profile of a wall of the structure, a profile of an attachment surface, the object, and an indentation at the structure.

* * * * *